Figure 3:
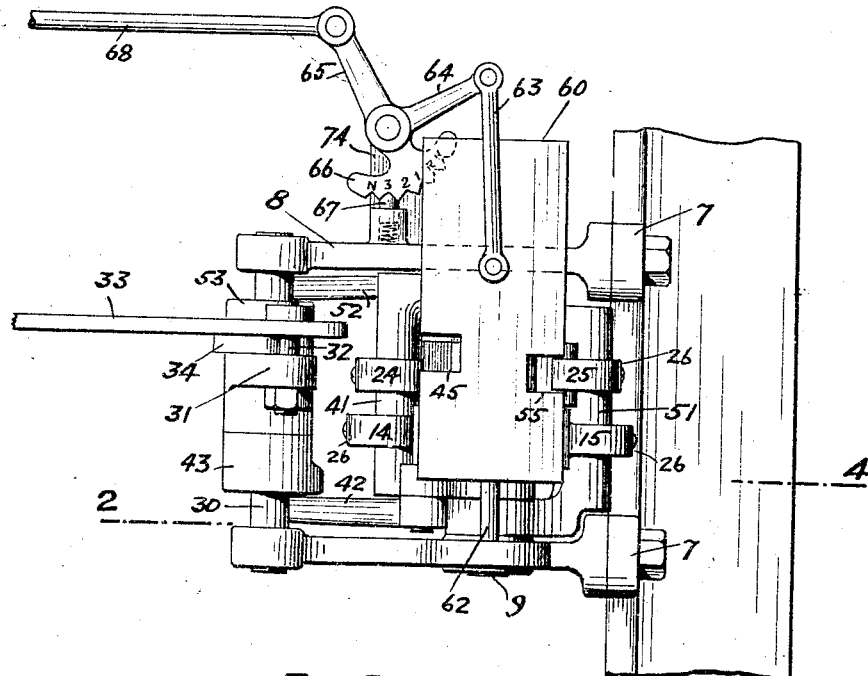

D. C. LEWIS.
MECHANICALLY OPERATED GEAR CHANGING MECHANISM FOR AUTOMOBILES.
APPLICATION FILED DEC. 5, 1913.
1,150,045.
Patented Aug. 17, 1915.
2 SHEETS—SHEET 1.
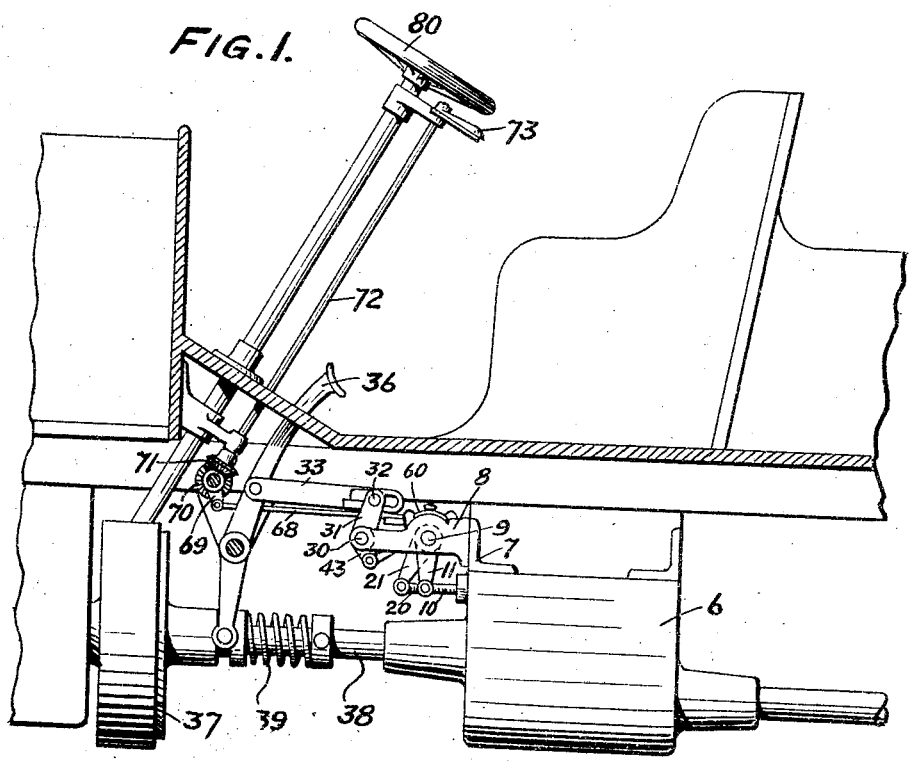
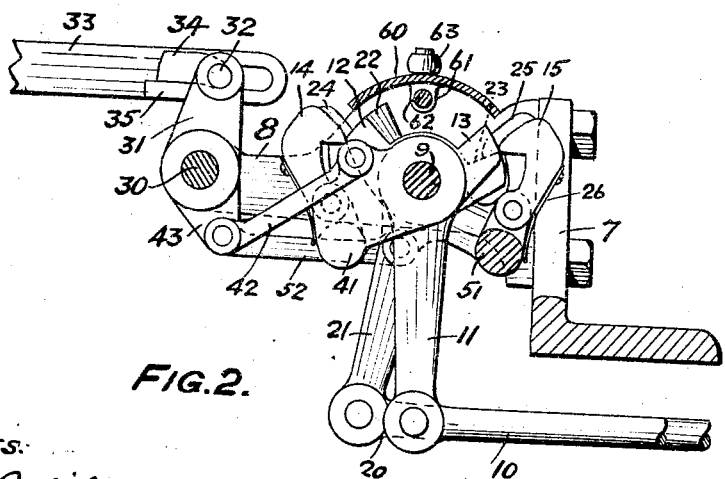
WITNESSES:
Robt R Kitchel
E. E. Wall
INVENTOR
Dean C. Lewis
BY
Frank S. Busser
ATTORNEY.

UNITED STATES PATENT OFFICE.

DEAN C. LEWIS, OF PHILADELPHIA, PENNSYLVANIA, ASSIGNOR TO LEWIS MANUFACTURING COMPANY, OF PHILADELPHIA, PENNSYLVANIA, A CORPORATION OF PENNSYLVANIA.

MECHANICALLY-OPERATED GEAR-CHANGING MECHANISM FOR AUTOMOBILES.

1,150,045. Specification of Letters Patent. Patented Aug. 17, 1915.

Application filed December 5, 1913. Serial No. 804,831.

*To all whom it may concern:*

Be it known that I, DEAN C. LEWIS, a citizen of the United States, residing at Philadelphia, county of Philadelphia, and State of Pennsylvania, have invented a new and useful Improvement in Mechanically-Operated Gear-Changing Mechanism for Automobiles, of which the following is a full, clear, and exact description, reference being had to the accompanying drawings, which form a part of this specification.

The object of my invention is to provide for changing gears of an automobile in such manner that the operator, by the mere swing of a lever, or by the operation of some equally simple device to some predetermined position, may so adjust mechanism that upon operating the ordinary clutch shifting contrivance, the said mechanism will coöperate with other mechanism to effect the shift of the gears to a position corresponding to the position of said lever.

A preferred embodiment of my invention is shown in the drawings, in which—

Figure 4:
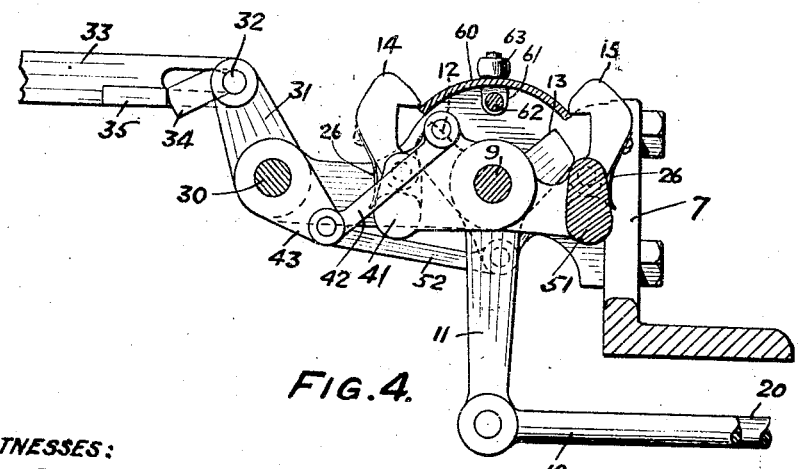

Figure 1 is a partial side elevation of a car with my invention applied thereto; Fig. 2 is a section on the line 2—4 of Fig. 3, showing one of the several positions of the gear-changing mechanism when the clutch is applied. Fig. 3 is a plan view of the positioning or selecting means and the gear shifting mechanism. Fig. 4 is a section on the line 2—4 of Fig. 3, showing the position of the gear-changing mechanism when the clutch is released.

The gear case 6 contains any convenient arrangement of change gears adapted to be shifted by means of rods 10 and 20 connected respectively to levers or arms 11 and 21 sleeved or pivoted on a shaft 9. It may be conveniently assumed that the gears are arranged to have three positions adapted to dictate as many different speeds and another position to provide for reversing the direction of motion. It may also be assumed that when the arms 11 and 21 are brought to a median position, as shown in Fig. 4, the gears are shifted to a neutral position; that arm 11, when swung back of its median position (to the right, Fig. 4), shifts the gears into position to reverse; that arm 11, when swung in front of its median position (to the left, Fig. 4), shifts the gears into the first speed position; that arm 21, when swung back to its median position, shifts the gears into the second speed position; and that arm 21, when swung in front of its median position, as shown in Fig. 2, shifts the gears into the third speed position. The above described change-gear mechanism is typical of those in common use and hence no description of the arrangement of the gears themselves is necessary. It will be understood, however, that the gear positions may vary in number and that the arms may be increased in number or may control other combinations of speed.

Each arm carries, near its sleeved upper end, a pair of projections having working upper faces, one projection extending forwardly and the other extending rearwardly. The two projections on arm 11 are numbered 12 and 13 and those on arm 21 are numbered 22 and 23. These four projections 12, 13, 22 and 23 are adapted to be actuated respectively by hook-shaped dogs 14, 15, 24 and 25; the dogs 14 and 24 being located in front of the shaft 9 and the dogs 15 and 25 back of the shaft 9.

The front dogs 14 and 24 are sleeved on pins carried on a frame 41 sleeved on the shaft 9. The rear dogs 15 and 25 are sleeved on pins carried on a frame 51 sleeved on the shaft 9. The frames 41 and 51 are connected respectively with links 42 and 52, which are connected respectively to arms 43 and 53 on a shaft 30.

The shafts 9 and 30 turn in bearings on brackets 8 secured to standards 7 on the gear case 6. The shaft 30 has an arm 31 carrying a pin 32 slidably engaging a slotted link 33 attached to one arm of the clutch lever 36, which is manually operable, by foot pressure or otherwise, from the front of the car. The other arm of the clutch lever engages a clutch 37 on the clutch shaft 38. A spring 38 normally holds the clutch 37 in operative position and draws the link to the right, as shown in Fig. 2, thereby turning the shaft 30 into position to swing forward the arms 43 and 53, thereby, through links 42 and 52 and frames 41 and 51, pulling down the two pairs of dogs 14, 24 and 15, 25.

The arm 31 and pin 32 carry an abutment 34. A projection 35 on the link 33 underrides the abutment 34 when the link is moved to its extreme right. The lever 36 may be manually operated to the extent required to release the clutch without operating the arm 31, this being permitted by the pin and slot connection between link 33 and arm 31. This movement causes the projection 35 to ride from under the abutment 34. If the lever 36 is moved in this direction to its extreme position, the link 33, through arm 31, turns the shaft 30 into position to swing back the arms 43 and 53, thereby pulling back links 42 and 52 and swinging frames 41 and 51 into position to elevate the two pairs of dogs 14, 24 and 15, 25. In this movement of the frames 41 and 53, thereby pulling back links 42 and 52 and swinging frames 41 and 51 into position to elevate the two parts of dogs 14, 24 and 15, 25. In this movement of the frames 41 and 51 they engage any of the projections 12, 22 and 13, 23 which have been swung down and restore their respective levers 11 and 21 to their central or neutral positions. The abutment 34, in the meantime, swings down back of the projection 35, so that, as soon as the clutch lever 36 is released, and is operated, by spring 39, to move the link 33 back, the gear changing mechanism is operated before the link 33 has completed its movement and consequently before the clutch is applied.

From the foregoing description it will be understood that if the gear-changing control levers 11 and 21 are in their neutral positions and if all four dogs 14, 15, 24 and 25 are rendered inoperative to engage, in their down movements, the projections 12, 13, 22 and 23, the release of the clutch lever 36, and the consequent forward movement of the link 33, from the position shown in Fig. 4 to that shown in Fig. 2, will effect no change of the gears, which will remain in neutral position; but that if any one of the dogs 14, 15, 24 and 25 are allowed to engage, in their down movements, the corresponding projection 12, 13, 22 or 23, and the remainder of the dogs are rendered inoperative, one of the gear-changing control levers 11 or 21 will be swung either forward or backward and thus effect a predetermined change in speed or direction. The following mechanism is provided to render all, or all but any given one, of the dogs 14, 15, 24 and 25 inoperative.

Extending between the brackets 8 is a rod 62 on which are sleeved ears 61 depending from a curved plate 60. This plate is connected, by a link 63, with one arm 64 of a three-armed lever pivoted on a projection 74 on one of the brackets 8. Another arm 65 of this lever is connected, by a line 68 with an arm 69 on a shaft carrying a bevel gear 70 which meshes with a bevel gear 71 on a shaft 72. The shaft 72 is arranged alongside the shaft of the steering wheel 80 and is provided, at its upper end, with a handle 73. The third arm 66 of the above mentioned three-armed lever is of segmental shape and has, on its periphery, a number of notches adapted for engagement with a spring-pressed pin 67 on the bracket 8.

The sliding plate 60 is provided, on opposite sides, with notches 45 and 55, each of a width sufficient to receive any of the dogs on the same side, 14 and 24 and 15 and 25 in alinement therewith. But any dog not alining with a notch will, when the clutch is released and the dogs consequently moved up, rest over the adjacent side edge of the plate, as shown in Fig. 4. Hence, when the clutch is applied, and the dogs moved down as hereinbefore described, none of the dogs will be in position to engage the working face of its corresponding projection 12, 13, 22 or 23 and hence none of the levers 11 and 21 will be moved away from the central position and the gears will remain in neutral position. This condition exists when the shaft 72 is turned to cause the lever 64—65—66 to turn into position to cause the pin 67 to engage one of the notches marked N.

If the last named lever is moved to cause the pin 67 to engage the notch marked 3 (representing the third speed position), the notched plate 60 is shifted into such position that the notch 55 therein alines with the dog 25, and the latter, under the impetus of its actuating spring 26, moves into the notch 55 as soon as the clutch lever 36 is moved to draw link 33 to its forward position, thus moving the hooked end of dog 25 over the projection 23 on lever 21. On the return movement of the clutch lever by the spring 39, all the dogs are moved down as before described; but only the dog 25 will engage its corresponding projection, and the lever 21 and rod 20 will therefore be moved forward, shifting the gears into the third speed position, as shown in Figs. 1 and 2. This occurs, as before described, before the clutch is actually applied; and thereafter, by a limited movement of the clutch lever 36 to the extent permitted by the free movement of the slotted link 33 on pin 32, the clutch may be released and re-applied without changing the gears.

If the shaft 72 is turned to cause the pin 67 to engage the notch marked R (representing the position to reverse), the notched plate 60 is shifted into position to aline its notch 44 with the dog 14. When the clutch 36 is moved to again draw the link 33 to its extreme forward position, the dog 14 moves into the notch 44 so that its hooked end extends over the projection 12 on arm 11, the hooked ends of the other dogs overlying the edges of the plate 60. On the return movement of the clutch lever by the spring 39 and the downward movement of the dogs, only dog 14 will engage its corresponding projection, and the lever 11 and rod 10 will therefore be moved backward, causing the gears to be shifted into position to reverse.

If the shaft 72 is turned to cause the pin 67 to engage the notch marked 1 (representing the first speed position), the notched plate 60 is shifted to cause its notch 55 to aline with the dog 15, thus allowing this dog to engage the projection 13 on arm 11 and swing this arm forward, thus causing the gears to be shifted into the first speed position.

If the shaft 72 is turned to cause the pin 67 to engage the notch marked 2 (representing the second speed position), the notched plate 60 is shifted to cause its notch 44 to aline with the dog 24, thus allowing this dog to engage the projection 22 on arm 21 and swing this arm backward, thus causing the gears to be shifted into the second speed position.

Having now fully described my invention, what I claim and desire to protect by Letters Patent is:

1. In a gear changing mechanism for automobiles, the combination with gear shifting arms, of a series of dogs adapted to actuate the arms, means to actuate the dogs, and selecting means to render different combinations of dogs inoperative to actuate the arms.

2. In a gear changing mechanism for automobiles, the combination with gear shifting arms, of a series of dogs adapted to actuate the arms, means to actuate the dogs, and selecting means to render all but any one of the dogs inoperative to actuate the arms, whereby the remaining dog will be alone effective to control the gear shifting.

3. In a gear changing mechanism for automobiles, the combination with gear shifting arms, of a series of dogs adapted to actuate the arms, means to actuate the dogs, and selecting means to render either all the dogs or different combinations of dogs inoperative to actuate the arms, whereby the dog actuating means will either be ineffective to actuate the arms or will effect the gear shifting in a predetermined manner.

4. In a gear changing mechanism for automobiles, the combination with gear shifting arms, of a series of dogs adapted to actuate the arms, means to actuate the dogs, and selecting means to render either all the dogs or all but one of the dogs inoperative to actuate the arms, whereby the dog actuating means may be either rendered inoperative or rendered operative to effect the gear shifting in a predetermined manner.

5. In a gear changing mechanism for automobiles, the combination with gear shifting arms, of a series of dogs adapted to actuate the arms, clutch-shifting mechanism and connections between the same and the dogs whereby the latter are given their operated movement, and independent selecting means to render different combinations of dogs inoperative to actuate the arms, whereby the operation of the clutch shifting mechanism will effect the gear shifting mechanism in a manner dependent upon the operation of said selecting means.

6. In a gear changing mechanism for automobiles, the combination with gear shifting arms, of a series of dogs adapted to actuate the arms, clutch shifting mechanism and connections between the same and the dogs, whereby the latter are operated, and independent selecting means adapted, when moved into different positions, to render either all the dogs or different combinations of dogs inoperative, whereby, dependent upon the position of said selecting means, the operation of the clutch shifting mechanism will either fail to operate the gear shifting mechanism or operate it in a predetermined manner.

7. In a gear changing mechanism for automobiles, the combination with a plurality of gear shifting arms adapted to assume either a neutral position or positions dictating different operative positions for the gears, of a series of dogs each of which is operative to move one of the arms into one of its operative positions, means to actuate the dogs, and selecting means to render different combinations of dogs inoperative to actuate the arms.

8. In a gear changing mechanism for automobiles, the combination with a plurality of gear shifting arms adapted to assume either a neutral position or positions dictating different operative positions for the gears, of a series of dogs each of which is operative to move one of the arms into one of its operative positions, clutch shifting mechanism and connections therefrom to the dogs whereby the latter are given their operative movement, and selecting means to render all the dogs or different combinations of dogs inoperative to actuate the arms, whereby the clutch shifting mechanism will either fail to operate the gear shifting mechanism or operate it in a predetermined manner.

9. In a gear changing mechanism for automobiles, the combination with gear shifting arms, each of which is adapted to assume either a neutral position or a plurality of different positions dictating different shifts of gears, of a series of dogs each of which is adapted to move one of the arms into one of its operative positions, means to actuate the dogs, and selecting means to render different combinations of dogs inoperative.

10. In a gear changing mechanism for automobiles, the combination with gear shifting arms each of which is adapted to assume either a neutral position or a plurality of different positions dictating different shifts of gears, of a series of dogs each of which is adapted to move one of the arms into one of its operative positions, clutch shifting mechanism and connections therefrom to the dogs whereby the latter are given their operative movements, and selecting means to render all the dogs or different combinations of dogs inoperative to actuate the arms, whereby the clutch shifting mechanism will either fail to shift the gears from neutral or operate them in a predetermined manner.

11. In a gear changing mechanism for automobiles, the combination with a gear-shifting arm adapted to assume either a neutral position or a plurality of different positions dictating different shifts of gears, mechanism including dogs and actuating means therefor, said mechanism adapted in one movement to restore the arm to neutral position and in another movement to move the arm into one of its operative positions dependent upon which dog is in operative relation with the arm, means to so move said mechanism, and selecting means permitting either or neither of the dogs to operate the arm.

12. In a gear changing mechanism for automobiles, the combination with gear shifting arms each adapted to assume either a neutral position or an operative position dictating a corresponding shift of gears, of mechanism comprising a movable frame and dogs moving with the frame and corresponding to the arms, said mechanism adapted in one movement of the frame to restore to a neutral position the arm corresponding to either dog if the said arm be in an operative position and in another movement of the frame to move the arm corresponding to either dog away from its neutral position into an operative position, means to so move the frame, and selecting means permitting either or neither of the dogs to operate its corresponding arm in the last named movement of the frame.

13. In a gear changing mechanism for automobiles, the combination with a gear-shifting arm adapted to assume either a neutral position or a plurality of different positions dictating different shifts of gears, of clutch shifting mechanism, mechanism including a pair of dogs and actuating means therefor, the latter mechanism adapted in one movement of the clutch shifting mechanism to restore the arm to neutral position, each of said dogs adapted in another movement of the clutch shifting mechanism to move the arm into one of its operative positions, and selecting means to render either dog or both dogs inoperative, to actuate the arms, whereby in the latter named movement of the clutch shifting mechanism, the gear-shifting arm will either remain in its neutral position or be shifted to one of its operative positions.

14. In a gear changing mechanism for automobiles, the combination with a gear-shifting arm adapted to assume either a neutral position or a plurality of different positions dictating different shifts of gears, of clutch shifting mechanism, mechanism including dogs and actuating means therefor, the latter mechanism adapted in one movement of the clutch shifting mechanism to restore the arms to neutral position, each of said dogs being adapted, in another movement of the clutch-shifting mechanism, to move one of the arms into one of its operative positions, and selecting means to render all the dogs or different combinations of dogs inoperative to actuate the arms, whereby in the latter named movement of the clutch shifting mechanism, the gear-shifting mechanism will either remain at neutral or be operated to effect a predetermined change of gears.

15. In a gear changing mechanism for automobiles, the combination with a gear shifting arm having projections, of dogs each of which is adapted to engage one of the projections and thus move the arm into one of its different positions dictating different shifts of gears, means to actuate the dogs, and selecting means to render one or both dogs inoperative to actuate the projections.

16. In a gear changing mechanism for automobiles, the combination with a plurality of gear shifting arms having projections and adapted to be moved into a plurality of positions, of dogs arranged on opposite sides of the arms, each of said dogs adapted to actuate one of the projections, and thus move one of the arms into one of its said positions, means to actuate the dogs, and selecting means to render different combinations of said dogs inoperative.

17. In a gear changing mechanism for automobiles, the combination with a gear shifting arm adapted to assume either a neutral position or a plurality of positions dictating different operative positions for the gears, mechanism adapted in one movement to move said arm into its neutral position, said mechanism including a pair of dogs each of which is adapted in the other movement of said mechanism to move the arm into one of its operative positions, selecting means to render one or both dogs inoperative, and means to so move said mechanism.

18. In a gear changing mechanism for automobiles, the combination with gear shifting arms each adapted to assume either a neutral position or a position dictating an operative position for the gears, mechanism adapted in one movement to move to a neutral position either arm that may be in an operative position, said mechanism including a pair of dogs corresponding to the arms and each adapted in the other movement of said mechanism to move its corresponding arm into its operative position, selecting means to render one or both dogs inoperative, and means to so move said mechanism.

19. In a gear shifting mechanism for automobiles, the combination with a plurality of gear shifting arms, dogs arranged on opposite sides of each arm, each of which dogs is adapted to move one of the arms into a position dictating a particular shift of gears, means to actuate all the dogs, and selecting means to render different combinations of dogs inoperative.

20. In a gear shifting mechanism for automobiles, the combination with a plurality of gear shifting arms, each of which is adapted to assume either a neutral position or a plurality of positions dictating different operative positions for the gears, mechanism adapted in one movement to move any arm not in a neutral position into such position, said mechanism including dogs, there being a pair of dogs on opposite sides of each arm, each of said dogs being adapted in the other movement of said mechanism to move its corresponding arm into one of its operative positions, and selecting means to render all or different combinations of dogs inoperative.

21. In a gear changing mechanism for automobiles, the combination with a gear shifting arm having oppositely disposed projections and adapted to assume either a median neutral position or a plurality of different positions dictating different operative positions for the gears, mechanism adapted in one movement to move said arm into neutral position, said mechanism including a pair of dogs each of which is adapted in the other movement of said mechanism to engage one of the projections and thus move the arm into one of its operative positions, means to so move said mechanism, and selecting means to render one or both dogs inoperative.

22. In a gear changing mechanism for automobiles, the combination with a shaft and a gear shifting arm thereon, a frame sleeved on the shaft, means to rock the frame on the shaft, a dog on the frame adapted when the frame is rocked in one direction to engage the arm and move it into an operative position, and selecting means to render the dog operative or inoperative.

23. In a gear changing mechanism for automobiles, the combination with a shaft and a gear shifting arm thereon adapted to assume a neutral position and also a position to move the gears into an active running position, a frame sleeved on the shaft and adapted when rocked in one direction to return said arm to neutral position, a dog on the frame adapted when the frame is rocked in the opposite direction, to engage the arm and move it into an operative position, and selecting means to render the dog operative or inoperative.

24. In a gear changing mechanism for automobiles, the combination with a shaft and a gear shifting arm thereon having projections on opposite sides of the shaft, frames sleeved on the shaft, dogs on opposite sides of the shaft and carried by the respective frames and adapted to actuate the respective projections when the frames are rocked, means to rock the frames, and selecting means to render either or both dogs inoperative.

25. In a gear changing mechanism for automobiles, the combination with a shaft and gear shifting arms thereon having projections, a frame sleeved on the shaft, dogs carried by the frame and adapted to actuate the projections of the respective arms when the frame is rocked, means to rock the frame, and selecting means to render either or both dogs inoperative.

26. In a gear changing mechanism for automobiles, the combination with a shaft and a gear shifting arm thereon having projections on opposite sides of the shaft, frames sleeved on the shaft and adapted when rocked in one direction to move the arm to a neutral position, dogs carried by the respective frames and on opposite sides of the shaft and each adapted when its respective frame is rocked in the other direction to engage the corresponding projection and swing the arm away from its neutral position, means to rock the frames, and selecting means to render either or both dogs inoperative.

27. In a gear changing mechanism for automobiles, the combination with a shaft and gear changing arms thereon each of which is adapted to assume a neutral position or to be moved to either side of its neutral position into an active position, projections on each arm on opposite sides of the shaft, frames sleeved on the shaft adapted when rocked in one direction to move the arms into neutral position, dogs on the frame arranged in operative relation with the respective projections and adapted when the frames are rocked in the opposite direction to actuate said projections, selecting means to render different combinations of the dogs inoperative, and means to rock the shaft.

28. In a gear changing mechanism for automobiles, the combination with a shaft and a gear shifting arm thereon having projections on opposite sides of the shaft, mechanism sleeved on the shaft, dogs carried by said mechanism on opposite sides of the shaft adapted to actuate the respective projections when said mechanism is rocked, a second shaft, two arms thereon, clutch shifting means connected with one of the last named arms, a link connecting the other of the last named arms with said mechanism, and selecting means to render either or both dogs inoperative.

29. In a gear changing mechanism for automobiles, the combination with a shaft and gear shifting arms thereon having projections, a frame sleeved on the shaft having dogs adapted to actuate the projections of the respective arms when said frame is rocked, a shaft, two arms thereon, clutch shifting means connected with one arm, a link connecting the other arm with said frame, and selecting means to render either or both dogs inoperative.

30. In a gear changing mechanism for automobiles, the combination with a shaft and a gear shifting arm thereon having projections on opposite sides of the shaft, mechanism sleeved on the shaft and adapted when rocked in one direction to move the arm to a neutral position, said mechanism including dogs on opposite sides of the shaft each adapted when the frame is rocked in the other direction to engage the corresponding projection and swing the arm away from its neutral position, a second shaft, two arms thereon, clutch shifting mechanism connected with one of the last named arms, a link connecting the other of the last named arms with said mechanism, and selecting means to render either or both dogs inoperative.

31. In a gear changing mechanism for automobiles, the combination with a shaft and gear changing arms thereon each of which is adapted to assume a neutral position or to be moved to either side of its neutral position into an active position, projections on each arm on opposite sides of the shaft, frames sleeved on the shaft adapted when rocked in one direction to move the arms into neutral position, dogs on the frames arranged in operative relation with the respective projections and adapted when the frames are rocked in the opposite direction to actuate said projections, a shaft, three arms thereon, clutch shifting mechanism connected with one arm, links connecting the other two arms with the respective frames, and selecting means to render inoperative different combinations of dogs.

32. In a gear changing mechanism for automobiles, the combination with two gear changing arms each of which is adapted to assume a neutral position or to be moved to either side of its neutral position into an active position, a pair of movable frames, two dogs carried by one frame adapted to move the arms in one direction from their neutral positions and two dogs carried by the other frame adapted to move the arms in the other direction from their neutral positions, means to operate both frames in unison, and selecting means to render inoperative different combinations of dogs.

33. In a gear changing mechanism for automobiles, the combination with a shaft and two gear changing arms thereon each of which is adapted to assume a neutral position or to be moved to either side of its neutral position into an active position, projections on each arm on opposite sides of the shaft, two frames sleeved on the shaft adapted when rocked in one direction to move the arms into their neutral positions, a pair of dogs on each frame, the dogs carried by one frame adapted to engage the respective projections on one side of the shaft and the dogs carried by the other frame adapted to engage the respective projections on the other side of the shaft when the frames are rocked in the other directions, means to rock both frames in unison, and selecting means to render inoperative different combinations of dogs.

34. In a gear changing mechanism for automobiles, the combination with a gear shifting arm, of a dog adapted to actuate the arm, means to actuate the dog, a plate adapted to be moved into the path of the dog to prevent the dog from actuating the arm, said plate having a recess which when brought into alinement with the dog permits the latter to operate the arm, and means to move the plate.

35. In a gear changing mechanism for automobiles, the combination with a gear shifting arm having projections on opposite sides, of dogs adapted to be moved to operate the respective projections, means to operate the dogs, a plate adapted to be moved into the paths of the dogs to prevent them from actuating their respective projections, said plate having recesses adapted in different positions of the plate to register with the several dogs and permit one or another of them to operate the corresponding projection, and means to so move the plate.

36. In a gear changing mechanism for automobiles, the combination with gear shifting arms, of a series of dogs adapted to actuate the arms, means to actuate the dogs, a plate adapted to be moved into the path of the dogs to prevent them from actuating the arms, said plate having recesses adapted in different positions of the plate to register with the several dogs and permit one or another of them to operate the corresponding projection, and means to so move the plate.

37. In a gear changing mechanism for automobiles, the combination with a gear shifting arm, a movable frame, a dog carried thereby, a spring tending to move the dog into operative relation with the arm, a plate movable into position to hold the dog out of operative relation with the arm, said plate being also movable into position to bring a recess therein opposite the dog and permit it to move into operative relation with the arm, and means to move the frame thereby causing the dog, if in operative relation with the arm, to operate it.

38. In a gear changing mechanism for automobiles, the combination with a gear shifting arm having projections on opposite sides, of dogs corresponding to the projections, springs tending to move the dogs into operative relation with the corresponding projections, a plate movable into position to hold the dogs out of operative relation with the several projections, said plate having recesses adapted in different positions of the plate to register with the several dogs and permit one or another of them to be moved by its spring into operative relation with its corresponding projection, means to actuate the dogs and means to move the plate into its different positions.

39. In a gear changing mechanism for automobiles, the combination with a gear changing element, a member for actuating said element, means to operate said member, a plate adapted to be interposed between said member and element and thus render said member inoperative, said plate having a recess adapted in one position of the plate to aline with said member and permit it to operate, and means to move the plate.

40. In a gear changing mechanism for automobiles, the combination with a gear changing element, members for actuating said element to move it into different operative positions, mechanism for operating said members in unison, a plate adapted to be interposed between said members and element and thus render said members inoperative, said plate having recesses one for each member, and means to move the plate into position to cause either member to register with its recess and also into position to maintain both members out of registry with their recesses, thereby rendering said mechanism either operative to move the gear changing element into a predetermined operative position, or inoperative to move the gear-changing element.

41. In a gear changing mechanism for automobiles, the combination with a plurality of gear changing elements each of which is adapted to assume a neutral position or to be moved into different operative positions, members corresponding to said elements and adapted to respectively operate them in one direction, members corresponding to said elements and adapted to respectively operate them in another direction, means to operate said members in unison, a plate adapted to be interposed between said members and elements and thus render said members inoperative, said plate having a recess on one side for the first named members and a recess on the other side for the second named members, means to move said plate into position to cause either recess to register with either of the corresponding members, thereby predetermining the operation of either gear changing element in either direction.

42. In a gear changing mechanism for automobiles, the combination, of clutch shifting mechanism adapted to be manually operated in one direction to release the clutch, gear changing mechanism, connections between the clutch shifting mechanism and the gear changing mechanism, said connections including means providing a limited movement for the clutch shifting mechanism relative to the gear changing mechanism in the initial part of the clutch releasing movement and to render the gear changing mechanism operative in the final part of the clutch releasing movement, and a spring connected with the clutch shifting mechanism and arranged to actuate the same in the direction to apply the clutch, said connections including also means enabling the clutch shifting mechanism to actuate the gear changing mechanism in the initial part of the clutch applying movement, whereby the clutch actuating spring is adapted to actuate the clutch to first shift the gears and then apply the clutch and permit the release of the clutch without affecting the gear shifting mechanism.

43. In a gear changing mechanism for automobiles, the combination with a gear changing element, of a clutch, clutch shifting mechanism adapted to be moved in one direction to apply the clutch, and in the other direction to release the clutch, and means to move said element into an operative position connected with and operated by the clutch shifting mechanism in its clutch applying movement, said clutch shifting mechanism having a limited movement relatively to said means permitting the application of the clutch after said element is operated and the release of the clutch without withdrawing said element from the position to which it has been moved, and members, moving respectively with said mechanism and means, adapted in the complete movement of said mechanism in the direction to release the clutch, to render said means operable by said mechanism in the initial part of the latter's clutch applying movement.

44. In a gear changing mechanism for automobiles, the combination with a gear changing element, of a clutch, clutch shifting mechanism including a slotted link, means for operating the gear changing element, said means including an arm and a pin thereon engaging the slot in the link, an abutment moving with said arm and pin, said link having a projection adapted, when the clutch shifting mechanism is moved into its extreme position to release the clutch, to move back of the abutment to permit the link to operate the arm in the initial movement of the clutch shifting mechanism in the opposite direction, and adapted, when the arm is so operated, to move out of line with the abutment to permit the link to move independently of the arm and pin in the final movement of the clutch shifting mechanism to apply the clutch.

In testimony of which invention, I have hereunto set my hand, at Philadelphia, on this 2nd day of December, 1913.

DEAN C. LEWIS.

Witnesses:
M. M. HAMILTON,
E. E. WALL.